(12) United States Patent
Sahdra et al.

(10) Patent No.: US 9,043,523 B2
(45) Date of Patent: May 26, 2015

(54) DONGLE DEVICE WITH VIDEO ENCODING AND METHODS FOR USE THEREWITH

(75) Inventors: Kuldip Sahdra, Richmond Hill (CA); Norman Stewart, Toronto (CA); Shijun D. Huang, Markham (CA); Mang Lun A. Tong, Scarborough (CA); Lewis Leung, Markham (CA)

(73) Assignee: VIXS Systems, Inc., Toronto, Ontario (CA)

( * ) Notice: Subject to any disclaimer, the term of this patent is extended or adjusted under 35 U.S.C. 154(b) by 839 days.

(21) Appl. No.: 13/212,970

(22) Filed: Aug. 18, 2011

(65) Prior Publication Data

US 2011/0304767 A1  Dec. 15, 2011

Related U.S. Application Data

(62) Division of application No. 11/950,410, filed on Dec. 4, 2007, now Pat. No. 8,028,094.

(51) Int. Cl.
*H04N 21/63* (2011.01)
*H04N 21/41* (2011.01)
*H04N 21/4402* (2011.01)

(52) U.S. Cl.
CPC ......... *H04N 21/631* (2013.01); *H04N 21/4104* (2013.01); *H04N 21/440218* (2013.01)

(58) Field of Classification Search
CPC .............. G06F 13/409; G06F 13/4045; G06F 13/4081; G06F 13/385; G06F 13/4068; H04N 7/012; H04N 7/01; H04N 7/0125; H04N 7/0135; H04N 7/0112
USPC .......................................... 710/300; 348/441
See application file for complete search history.

(56) References Cited

U.S. PATENT DOCUMENTS

| | | | |
|---|---|---|---|
| 6,519,341 B1 * | 2/2003 | Enari ............. | 380/217 |
| 6,791,620 B1 * | 9/2004 | Elswick et al. ....... | 348/441 |
| 7,308,099 B1 * | 12/2007 | Allamanche et al. ........ | 380/210 |
| 8,284,209 B2 * | 10/2012 | Neuman ............ | 345/530 |
| 8,605,217 B1 * | 12/2013 | Lafon et al. .......... | 348/497 |
| 2003/0076446 A1 * | 4/2003 | Cho .............. | 348/558 |
| 2004/0096187 A1 * | 5/2004 | Lee .............. | 386/46 |
| 2004/0252246 A1 * | 12/2004 | Lee .............. | 348/725 |
| 2005/0124342 A1 * | 6/2005 | Wu et al. ............ | 455/435.2 |
| 2005/0128349 A1 * | 6/2005 | Takamori et al. ........ | 348/441 |
| 2005/0190071 A1 * | 9/2005 | Chen et al. .......... | 340/825.24 |
| 2006/0171689 A1 * | 8/2006 | Smith ............ | 386/125 |
| 2007/0036525 A1 * | 2/2007 | Chang ............ | 386/125 |

(Continued)

FOREIGN PATENT DOCUMENTS

| | | | | |
|---|---|---|---|---|
| CA | 2007573 A1 * | 8/1990 | .............. | H04N 9/68 |
| CN | 2798440 Y * | 7/2006 | .............. | H04N 5/00 |

(Continued)

*Primary Examiner* — Faisal M Zaman
(74) *Attorney, Agent, or Firm* — Garlick & Markison; Bruce E. Stuckman

(57) ABSTRACT

A universal serial bus (USB) dongle device includes a USB interface that receives selection data from a host device that indicates a selection of a first video format from a plurality of available formats. The USB interface also receives an input video signal from the host device in the first video format and a power signal from the host device. An encoding module generates a processed video signal in a second video format based on the input video signal, wherein the first video format differs from the second video format. The USB interface transfers the processed video signal to the host device.

8 Claims, 10 Drawing Sheets

(56) References Cited

U.S. PATENT DOCUMENTS

| | | | |
|---|---|---|---|
| 2007/0109450 A1* | 5/2007 | Lee | 348/730 |
| 2007/0139551 A1* | 6/2007 | Hwang | 348/441 |
| 2008/0155639 A1* | 6/2008 | Miyagi | 725/139 |
| 2008/0168568 A1* | 7/2008 | Brodersen et al. | 726/30 |
| 2008/0212940 A1* | 9/2008 | Tan et al. | 386/124 |
| 2008/0218633 A1* | 9/2008 | Shen et al. | 348/496 |
| 2008/0239639 A1* | 10/2008 | Yun | 361/681 |
| 2008/0252778 A1* | 10/2008 | Dunki-Jacobs | 348/441 |
| 2009/0086811 A1* | 4/2009 | Ducharme | 375/240.01 |
| 2009/0268087 A1* | 10/2009 | Zhang et al. | 348/441 |
| 2012/0044985 A1* | 2/2012 | Tao et al. | 375/240.01 |

FOREIGN PATENT DOCUMENTS

| | | | | |
|---|---|---|---|---|
| KR | 20040066623 A | * | 7/2004 | H04N 7/12 |
| KR | 20070065804 A | * | 6/2007 | H04N 7/24 |
| KR | 20080043499 A | * | 5/2008 | H04N 7/22 |
| KR | 20090083580 A | * | 8/2009 | H04N 5/765 |
| KR | 20110015399 A | * | 2/2011 | H04N 7/26 |

\* cited by examiner

US 9,043,523 B2

DONGLE DEVICE WITH VIDEO ENCODING AND METHODS FOR USE THEREWITH

CROSS REFERENCE TO RELATED APPLICATIONS

The present application claims priority under 35 USC 121 as a divisional application of the application entitled, "USB VIDEO CARD AND DONGLE DEVICE WITH VIDEO ENCODING AND METHODS FOR USE THEREWITH," having Ser. No. 11/950,410, filed on Dec. 4, 2007, the contents of which are incorporated herein by reference thereto for all purposes.

TECHNICAL FIELD OF THE INVENTION

The present invention relates to dongle devices and video cards for the encoding of media signals such as video signals.

DESCRIPTION OF RELATED ART

Digital video recorders, that digitize and store broadcast video signals, have gained popularity over the last several years. Users can select programs of interest and have easy access to the programs that they have recorded for playback at any time. The buffering that is used also allows live television broadcasts to be paused, rewound and played in slow motion, etc. Originally manufactured as stand alone devices, software applications, such as Microsoft Media Center Edition 2005 allow users to operate their computer as a digital video recorder.

In addition, handheld multifunction devices are being manufactured with video display functionality. Examples include the Apple iPod, Palm Treo, etc. While these devices are capable of playing digital video files, they cannot receive broadcast video signals and do not contain the functions and features of a digital video recorder. A single user may wish to watch a video program that came from any of a number of sources on any of a number of different devices that may arrive in different video formats.

The limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
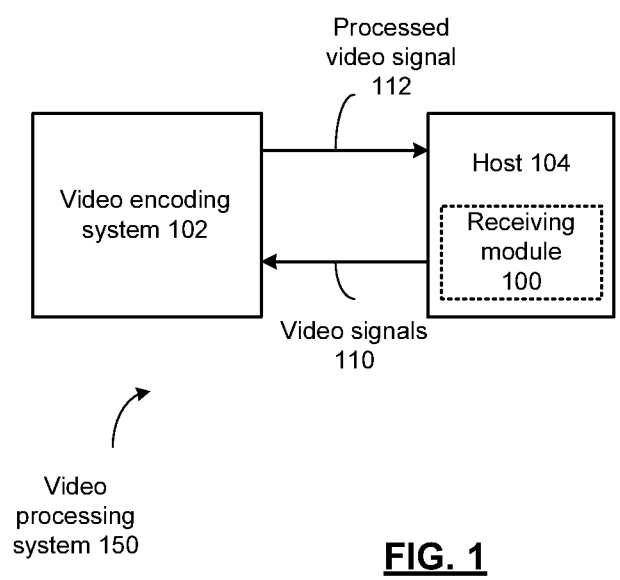
FIG. 1 presents a block diagram representation of a video processing system 150 in accordance with an embodiment of the present invention.

FIG. 1 presents a block diagram representation of a video processing system 150 in accordance with an embodiment of the present invention. In particular, video processing system 150 includes a receiving module 100 included in a host 104, such as a set-top box, television receiver, personal computer, cable television receiver, satellite broadcast receiver, broadband modem, 3G transceiver or other device that includes an information receiver or transceiver that is capable of receiving video signals 110 from one or more sources such as a broadcast cable system, IP television network, a broadcast satellite system, the Internet, a digital video disc player, a digital video recorder, or other video source.

USB dongle device 10 is coupled to the host device 104 to encode one or more of video signals 110 to form a processed video signal 112 that is transferred to respective host 104 to play, process, store, distribute or otherwise operate based on the processed video signal. This encoding can include transcoding, including transrating and transcaling, and in addition, encrypting or transcrypting, the video signal 110 into processed video signals 112 in a different format.

In an embodiment of the present invention, the video signal 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 and processed video signals 112 can be formatted in accordance with one or more digital video codec standards such as H.264, MPEG-4 Part 10 Advanced Video Coding (AVC) or other digital formats such as a Moving Picture Experts Group (MPEG) format (such as MPEG1, MPEG2 or MPEG4), Quicktime format, Real Media format, Windows Media Video (WMV) or Audio Video Interleave (AVI), or another digital video formats, either standard or proprietary that may or may not include a related audio signal. In addition, the frame rate and/or resolution, can be converted when converting the video signal 110 into processed video signals 112. Further details of the operation of USB dongle device 10 including several optional functions and features will be described in greater detail in conjunction with the figures that follow.

Figure 2:
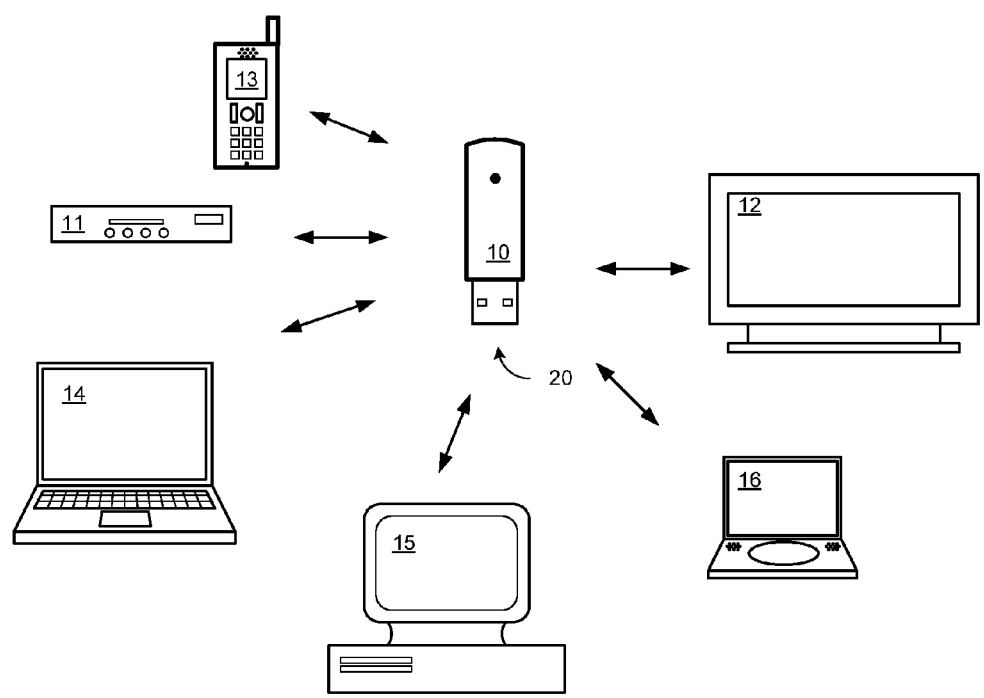
FIG. 2 presents a pictorial representation of example host devices 11-16 in accordance with an embodiment of the present invention.

FIG. 2 presents a pictorial representation of example host devices 11-16 in accordance with an embodiment of the present invention. In particular, a universal serial bus (USB) dongle device 10 that can be coupled to a range of host devices including host devices 11-16. USB dongle device 10 includes a video encoding system that receives a video signal, such as video signal 110 in a first format from the USB interface 20. The USB dongle device 10 generates a processed video signal, such as processed video signal 112 in a second format that is different from the first format based on the video signal and sends the processed video signal 112 to the host device 11, 12, 13, 14, 15 or 16 via the USB interface 20. As discussed in conjunction with FIG. 1, the second format can be encoded, transcoded, transrated, transcaled and/or transcrypted from the first format.

In particular, examples of host device 104 include digital video recorder/set top box 11, television or monitor 12, wireless telephony device 13, computers 14 and 15, personal video player 16, or other host devices that process video signals such as processed video signal 112. While described above as a USB dongle device 10, this device can similarly be implemented in any one of a number of other form factors such as a PC card, memory card, personal computer memory card international association (PCMCIA) card or other device that is coupleable to one or more host devices via an Ethernet connection, a memory card interface, USB connection, Firewire (IEEE 1394) connection, small computer system interface (SCSI), PCMCIA interface, or other interface either standard or proprietary.

In one mode of operation, USB dongle device 10 is provided to allow one or more of the host devices 11-16 to receive a video signal 110 in one format but to operate on processed video signal 112 in a different format. When USB dongle device 10 is coupled to the host device, the video signal 110 can be converted into processed video 112 for the purposes of storage, display, further processing, etc. For example, television 12 can receive signals in MPEG2 format and, using USB dongle device 10 transcode these video signals into an HDMI format. In a further example, computer 14 can receive high-definition TV (HDTV) broadcast signals via a television card and, using the USB dongle device 10, convert these HDTV signals into H-264 encoded signals to be stored as compressed digital video files. In yet another example, DVR/set top box 11 can receive 480 p signals and interpolate or upconvert these signals to a 720 p resolution for use with a particular display screen or monitor. In an additional example, encrypted video signals received by laptop computer 14 can be decrypted by USB dongle device 10 so that they can be stored or displayed. These examples provide but a few illustrations of the possible video encoding performed by USB dongle device 10.

Figure 3:
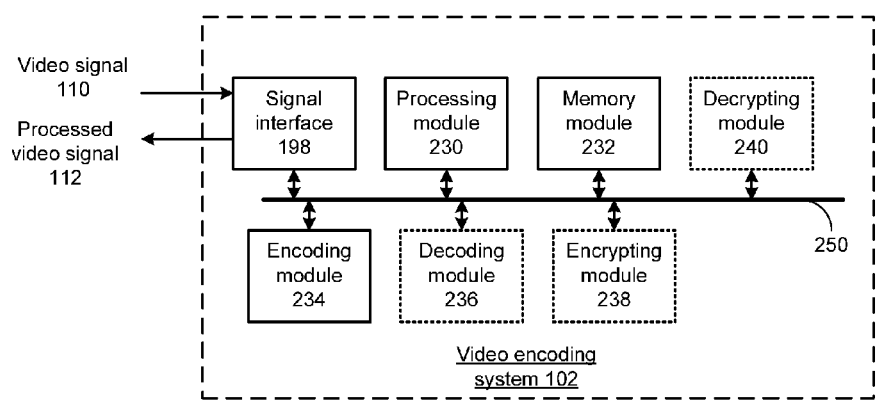
FIG. 3 presents a block diagram representation of a USB dongle device 10 in accordance with an embodiment of the present invention.

FIG. 3 presents a block diagram representation of a USB dongle device 10 in accordance with an embodiment of the present invention. In particular, USB dongle device 10 operates in accordance with many of the functions and features of the H.264 standard, the MPEG-4 standard, VC-1 (SMPTE standard 421M) or other standard, to produce processed video signals 112 by encoding, transrating, transcaling, and/or transcoding video signal 110 that is received via signal interfaces 198, such as USB interface 20 or other signal interface. In particular, USB dongle device 10 operates to optionally decrypt, and then encode, transcode, transrate, and/or transcale the video signal 110 and then optionally encrypt or re-encrypt ("transcrypt") the video signal 110 to produce a processed video signal 112 that is optionally transcrypted, transcoded, transcaled, transrated, into an altered format and is transferred to a host device via signal interface 198 in conjunction with an optional host protocol.

The USB dongle device 10 includes a signal interface 198, processing module 230, memory module 232, encoding module 234, decoding module 236, optional encrypting module 238 and optional decrypting module 240. The processing module 230, signal interface 198, encoding module 234, decoding module 236, encrypting module 238, and decrypting module 240 can be implemented using a single processing device or a plurality of processing devices. Such a processing device may be a microprocessor, co-processors, a microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules. The modules of USB dongle device 10 can be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional buses can likewise be implemented in accordance with the present invention.

In one mode of operation, encoding module 234 produces an encoded or transcoded video stream based on either video signal 110 or based on a decoded and/or decrypted version of video signal 110 as processed by decoding module 236 and/or decrypting module 240. The video signal 110 can be an analog video signal that is optionally encoded, including optional transcaling to a different resolution, transrating to a different frame rate and/or encrypted by USB dongle device 10. In the alternative, the video signal 110 can be a digital video signal that is optionally transcoded, including transcaling to a different resolution, transrating to a different frame rate and/or encrypted via a Rivest-Shamir-Adeleman (RSA) encryption algorithm, Diffie-Hellman encryption algorithm, or other encryption technique, either public key or otherwise or transcrypted (if the video signal 110 was also encrypted) by USB dongle device 10.

Encoding module 234 can selectably operate different compression methods and can further include decimation and interpolation to increase or decrease the frame rate and/or resolution of the processed video signal 112 from the corresponding video signal 110. While the video content of processed video signal 112 is based on the video content of video signal 110, processed video signal 112 can have a different video format, including a different scale, frame rate, compression or different compression format, and/or can be encrypted or re-encrypted.

For instance signal interface 198 can receive a video signal 110 in a first format from a host device, such as one of the host devices 11-16. Encoding module 102 generates the processed video signal 112 in a second format based on the video signal 110, wherein the first format differs from the second format in terms of compression standard, frame rate, resolution, and/or encryption. Signal interface 198 can then send the processed video signal 112 back to the host device.

When the first format is itself a digital video format, decoding module 236 can decode video signal 110 from the first format to generate a first decoded video signal. In these circumstances, the encoding module 234 generates the processed video signal 112 by encoding the first decoded video signal, and the second format is at least one, transcoded, transcaled, and transrated, from the first format.

As discussed above, the video signal 110 can be encrypted signals. Decryption module 240 can decrypt the video signal 110 from the first format to generate a first decrypted video signal. In this case, encoding module 234 generates processed video signal 112 by encoding the decrypted video signal. Further, the processed video signals 112 can be encrypted by video coding system 102. In particular, encryption module 238 can encrypt the processed video signal from encoder module 234 to form processed video signal 112 (or re-encrypt the processed video signal from encoder module 234 to form processed video signal 112 if the video signal 110 was originally encrypted).

As discussed above, the processed video signals 112 can be encrypted or re-encrypted. If so, encryption module 238 encrypts the processed video signal 112 prior to being sent to the host device.

In an embodiment of the present invention, the processing module 230 responds to selection data stored in a register of processing module 230 or other memory, such as memory module 232, that selects the particular input format of video signal 110 and the desired output format of processed video signals 112 including the frame rate, resolution, compression format, whether or not the video signal 110 is encrypted, whether or not processed video signals 112 is to be encrypted and the encryption keys or other encryption methods and the other necessary parameters to select the formats of video signal 110 and processed video signal 112. This selection data can be preloaded in the memory module 232 of USB dongle device 10 or uploaded from a particular host device 11-16 via the signal interface 198 based on a particular implementation or application or be stored after selection of the particular formats by a user of a host device 11-16.

Figure 4:
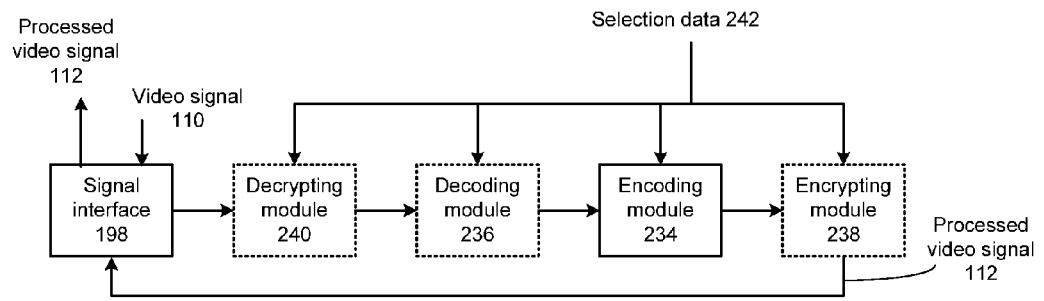
FIG. 4 presents a block diagram representation that represents the processing flow of USB dongle device 10 in accordance with an embodiment of the present invention.

FIG. 4 presents a block diagram representation that represents the processing flow of USB dongle device 10 in accordance with an embodiment of the present invention. In particular, this diagram represents a particular processing flow from video signal 110 to processed video signal 112. Selection data 242 are used to selectively activate or bypass decryption module 240 depending on whether video signal 110 is encrypted. Further, selection data 242 are used to selectively activate or bypass decoding module 236 depending on whether video signal 110 is an encoded video signal. In addition, selection data 242 are used to selectively activate or bypass encryption module 238 depending on whether processed video signals 112 is to be encrypted. Further encoding module 234 is responsive to selection data 242 to determine whether to encode and how to encode the content of video signal 110.

Figure 5:
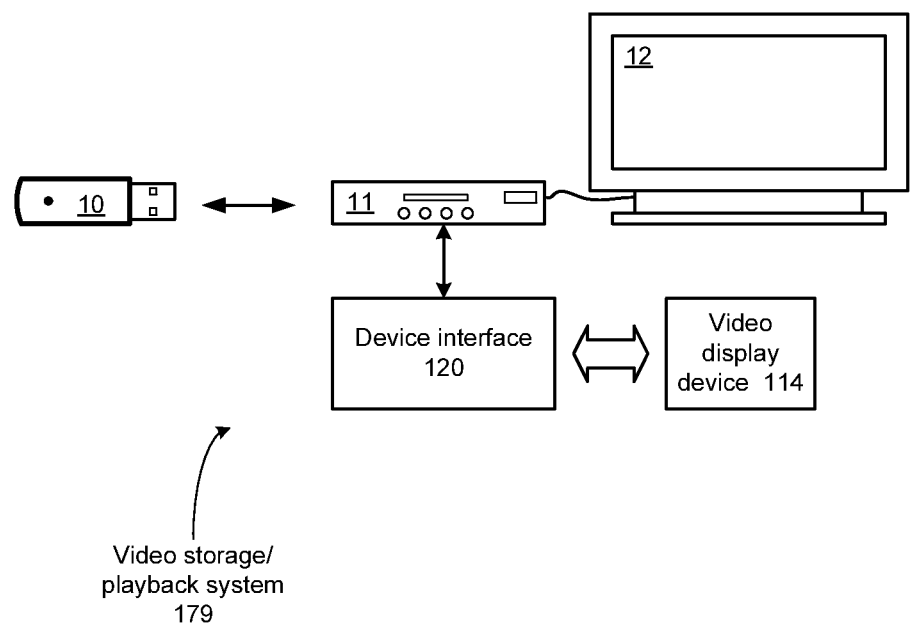
FIG. 5 presents a block diagram representation of a video storage system 179 in accordance with an embodiment of the present invention.

FIG. 5 presents a block diagram representation of a video storage system 179 in accordance with an embodiment of the present invention. In particular, USB dongle device 10 is shown as coupled to device 11 is a set top box that includes built-in digital video recorder functionality, a stand alone digital video recorder, a DVD recorder/player or other device. USB dongle device 10 and set top box 11 cooperate to, for instance, decrypt and store the processed video signal 112 for display on video display device such as television 12. While these particular devices are illustrated, video storage system 179 can include a hard drive, flash memory device, computer, DVD burner, or any other device that is capable of generating, storing, decoding and/or displaying the content of processed video signal 112. In addition, device 11 includes a device interface 120 for coupling to another video device, such as video display device 114 and device 11 can further transfer a compressed video file that includes video signal 112, to video display device 114 when coupled to device interface 120. Video display devices 114 can include a television, monitor, computer, handheld device or other video display device that creates an optical image stream either directly or indirectly, such as by projection, based on processed video signal 112, the decoding of a digital video signal or the playback of a stored digital video file.

In operation, USB dongle device 10 creates processed video signals 112 in different formats from video signal 110 to accommodate playback by two different video display devices such as a television and a personal video recorder. These processed video signals 112 can be streamed to video display devices 12 and 114 for simultaneous or non-simultaneous playback. In the alternative one or both of the processed video signals 112 can be stored as a compressed video file for later playback on television 12 or transfer to video display device 114.

In an embodiment of the present invention, device interface 120 includes a wired link that allows the video processing device 114 to be coupled to the device 11 to transfer one or more stored digital video files for playback by the video processing device 114. The coupling can include a Universal Serial Bus (USB) connection, an Institute of Electrical and Electronics Engineers (IEEE) 1394 (Firewire) connection, or other wired connection that operates in accordance with either a standard or custom interface protocol. In this fashion, a video display device 114, such as an MP3/video player, game/video player PDA/video player, cellphone/video player or other handheld device can be coupled to the device 11 to transfer compressed digital audio and/or video files between the two devices through a synchronization or "sync" operation, or by command from one or the other of the two devices. In addition, the device 11 can optionally supply power to the video display device 114 when coupled, in order to operate or recharge the device.

In another embodiment of the present invention, the device interface 120 includes a wireless link between the device 11 and the video display device 114 that operates in accordance with a wireless network protocol such as 802.11a,b,g,n (referred to generically as 802.11x), Bluetooth, Ultra Wideband (UWB) or other wireless connection that operates in accordance with either a standard or custom interface protocol.

In a further embodiment, the device interface 120 couples to video display device 114 using a removable memory, such as a removable drive, disk or memory card that is coupleable to either the device interface 120 or the video display device 114. In this fashion, the removable memory can be written with a compressed digital video file when inserted in the device interface 120 and read when inserted in video display device 114 for playback of the associated content.

Figure 6:
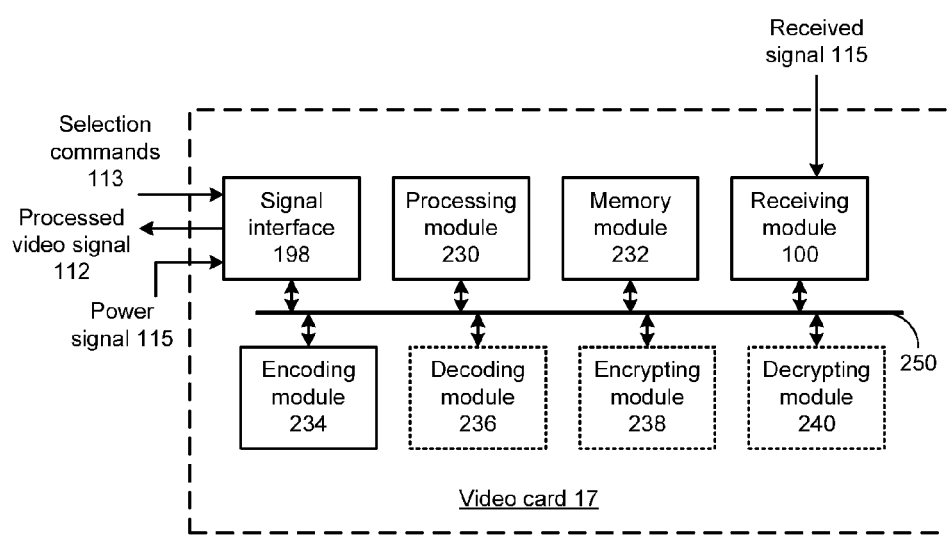
FIG. 6 presents a block diagram representation of a video card 17 in accordance with an embodiment of the present invention.

FIG. 6 presents a block diagram representation of a video card 17 in accordance with an embodiment of the present invention. In particular a video card 17 is shown that includes similar elements of USB dongle device 10 that are referred to by common reference numerals. In addition, video card 17 includes its own receiving module 100. Therefore, instead of receiving video signal 110 via the signal interface 198, video signal 110 is generated by receiving module 100 from a received signal 115. Receiving module 100 can include an information receiver or transceiver or other video receiver that is capable of receiving signal 115 from one or more sources such as a broadcast cable system, IP television network, a broadcast satellite system, the Internet, a digital video disc player, a digital video recorder, or other video source either in a wireless fashion in a wired fashion through connection to a video source or network and to generate the video signal 110 in response thereto.

Signal interface 198 optionally receives one or more selection commands 113 from the host device that video card 17 is coupled to, that commands the receiving module to tune or otherwise select a particular video program. In this fashion, the user of the host device, such as host devices 11-16 can select a particular video channel or video broadcast, streaming video signal or other video program to be received by receiving module 100 and converted to video signal 110.

In operation, receiving module 100 receives a video signal 110 in a first format, based on a selection command 113. Encoding module 234 generates a processed video signal 112 in a second format based on the video signal 110, wherein the first format differs from the second format. Signal interface 198 transfers the processed video signal 112 to the host device, that receives the selection command 113 from the host device and optionally receives a power signal 115 from the host device to power modules of video card 17.

In one example, receiving module 100 includes a wireless local area network receiver that receives a received signal 115 that includes data in a packetized digital format. Decoding module 236 decodes the video signal 110 from the packetized digital format to generate a decoded video signal. Encoding module 234 generates the processed video signal 112 by encoding the decoded video signal in order transcode, transcale, and/or transrate this video signal 110.

In a further example, receiving module 100 received signal 115 that includes video data in an encrypted digital format. Decryption module 240 decrypts the video signal to generate a decrypted video signal, and encoding module 234 generates the processed video signal 112 by encoding the decrypted video signal. It should be noted that video card 17 is otherwise capable of operating in accordance with USB dongle device 10, but based on video signal 110 optionally generated in response to one or more selections commands 113 by on-board receiving module 100.

Figure 7:
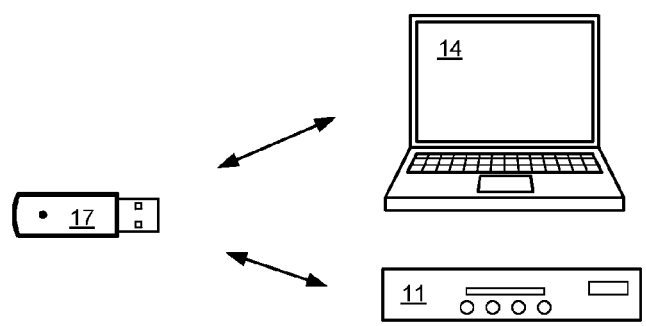
FIG. 7 presents a pictorial representation of video card 17 and example host devices 11 and 14 in accordance with an embodiment of the present invention.

FIG. 7 presents a pictorial representation of video card 17 and example host devices 11 and 14 in accordance with an embodiment of the present invention. In particular, video card 17 is coupleable to a host device such as computer 14, set top box 11 or other host devices to provide the functionality of USB dongle device 10 for video signals that are received directly by the host device and/or to provide processed video signals 112 to the host device that are received by the video card 17. While video card 17 is shown as a USB dongle device, this device can similarly be implemented in any one of a number of other form factors such as a PC card, ExpressCard, memory card, personal computer memory card international association (PCMCIA) card or other device that is coupleable to one or more host devices via an Ethernet connection, a memory card interface, PCI interface, PCI Express interface, USB connection, Firewire (IEEE 1394) connection, small computer system interface (SCSI), PCMCIA interface, or other interface either standard or proprietary.

Figure 8:
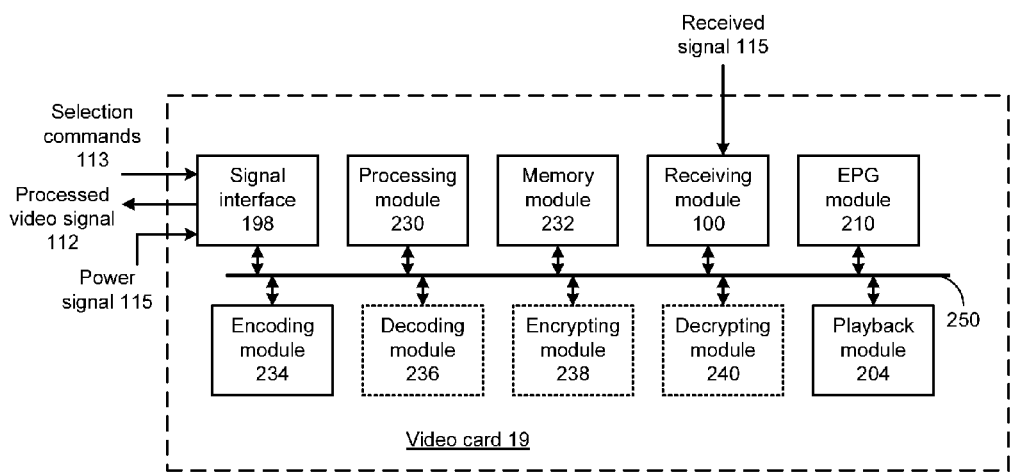
FIG. 8 presents a block diagram representation of a video card 19 in accordance with an embodiment of the present invention.

FIG. 8 presents a block diagram representation of a video card 19 in accordance with an embodiment of the present invention. Video card 19 includes many similar elements of video card 17 that are referred to by common reference numerals. In addition, the memory module 232 can store the processed video signal 112 as a compressed video file. Playback module 204 can retrieve the compressed video file from memory module 232, and regenerate the processed video signal 112 based on the compressed video file, and buffer the processed video signal for transfer to the host device and to enable pause, rewind and fast forwarding of video content. Further, receiving module 100 receives program data, relating to a plurality of possible video programming selections, as a portion of received signal 115. This program data can optionally be stored in memory module 232. Electronic program guide module presents this program data to the host device as a part of processed video signal 112, in the form graphics overlays, menus video clips or other processed video supplied to the host device via the signal interface 198 to prompt the user of the host device to make a particular program selection. In this embodiment, the host device generates one or more selection commands 113 based on one of the plurality of programming selections.

In an embodiment of the present invention, EPG module 210 includes an electronic program guide that allows a user, through operation of host device to obtain information regarding current or upcoming programs that can be viewed or recorded. Playback module 204 is coupled to memory module 232 to regenerate the processed video signal 112 from a selected one of the plurality of compressed video files. Selection commands 113 can further provides a mechanism for a user of host device/video card 19 system to establish playback and record settings and preferences, to interactively choose programs to record, to select stored programs for playback, to pause, fast forward and rewind playback of compressed video files and buffered live video streams used to generate the processed video signal 112.

While a particular architecture is described above, other architectures including alternative bus architectures, and architectures where the functionality of bus 250 is replaced by one or more direct connections or links, can likewise be implemented. In a particular embodiment of the present invention, portions of the video card 19 are implemented by Microsoft Media Center Edition 2005 along with other software add-ons that operate in conjunction with processing module 230 to perform the record/playback functionality of video card 19.

Figure 9:
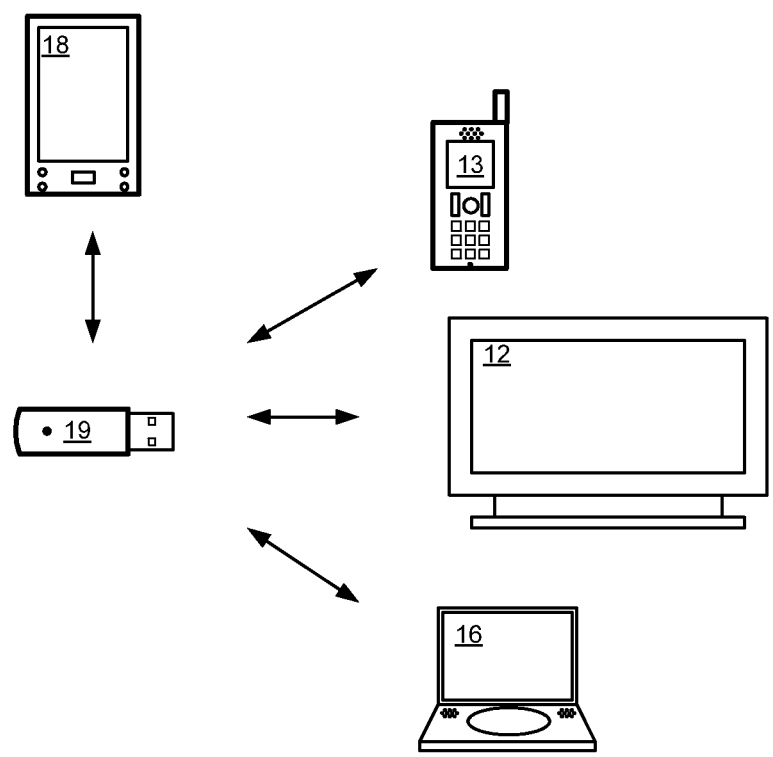
FIG. 9 presents a pictorial representation of video card 19 and example host devices 12, 13, 16 and 18 in accordance with an embodiment of the present invention.

FIG. 9 presents a pictorial representation of video card 19 and example host devices 12, 13, 16 and 18 in accordance with an embodiment of the present invention. In particular, video card 19 is coupleable to a host device such as wireless phone 13, television or monitor 12, video player 16 or other host device to provide video reception, and processing and video storage and playback functionality directly to these devices. While video card 19 is shown as a USB dongle device, this device can similarly be implemented in any one of a number of other form factors such as a PC card, memory card, personal computer memory card international association (PCMCIA) card or other device that is coupleable to one or more host devices via an Ethernet connection, a memory card interface, USB connection, Firewire (IEEE 1394) connection, small computer system interface (SCSI), PCMCIA interface, or other interface either standard or proprietary.

Figure 10:
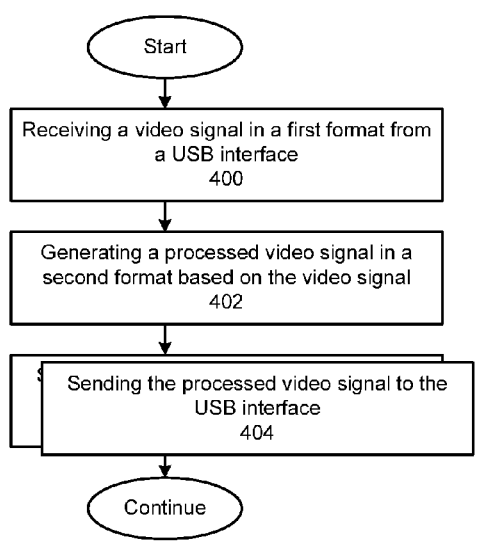
FIG. 10 presents a flowchart representation of a method in accordance with an embodiment of the present invention.

FIG. 10 presents a flowchart representation of a method in accordance with an embodiment of the present invention. In particular a method is presented for use in conjunction with one or more functions and features described in conjunction with FIGS. 1-9. In step 400, a video signal is received in a first format from a USB interface. In step 402, a processed video signal is generated in a second format based on the video signal, wherein the first format differs from the second format. In step 404, the processed video signal is sent to the USB interface.

In an embodiment of the present invention, the second format is at least one of, transcoded, transrated, transcaled and transcrypted from the first format.

Figure 11:
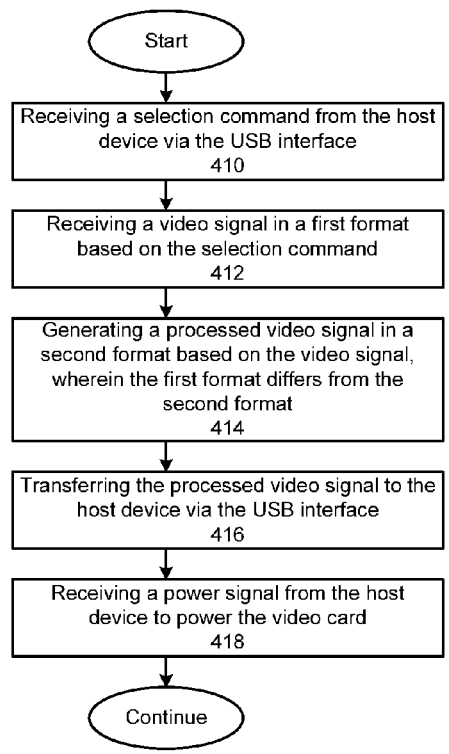
FIG. 11 presents a flowchart representation of a method in accordance with an embodiment of the present invention.

FIG. 11 presents a flowchart representation of a method in accordance with an embodiment of the present invention. In particular a method is presented for use in conjunction with one or more functions and features described in conjunction with FIGS. 1-10. In step 410, a selection command is received from a host device via a USB interface. In step 412, a video signal is wirelessly received in a first format, based on the selection command. In step 414, a processed video signal is generated in a second format based on the video signal, wherein the first format differs from the second format. In step 416 the processed video signal is transferred to the host device via the USB interface. In step 418 a power signal is received from the host device to power the video card.

Figure 12:
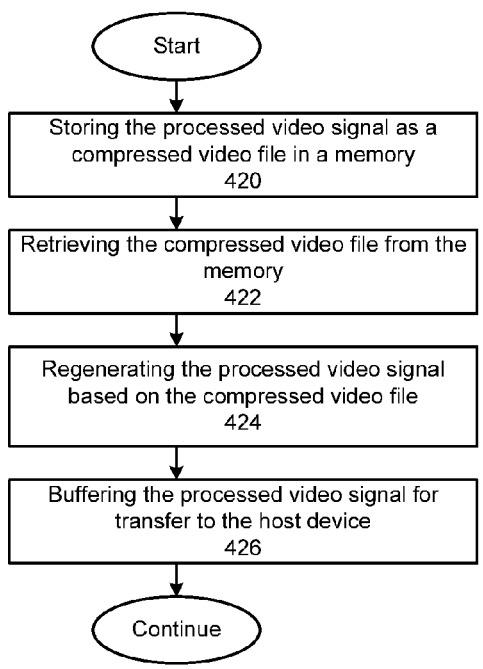
FIG. 12 presents a flowchart representation of a method in accordance with an embodiment of the present invention.

FIG. 12 presents a flowchart representation of a method in accordance with an embodiment of the present invention. In particular a method is presented for use in conjunction with one or more functions and features described in conjunction with FIGS. 1-11. In step 420 the processed video signal is stored as a compressed video file in a memory. In step 422, the compressed video file is retrieved from the memory. In step 424, the processed video signal is regenerated based on the compressed video file. In step 426, the processed video signal is buffered for transfer to the host device.

Figure 13:
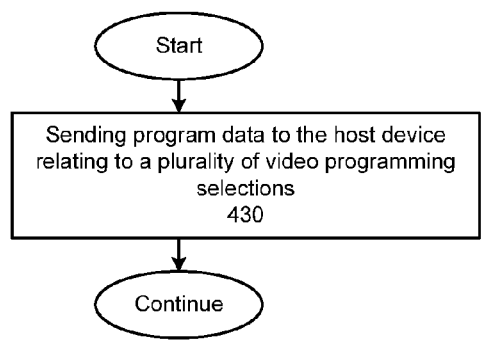
FIG. 13 presents a flowchart representation of a method in accordance with an embodiment of the present invention.

FIG. 13 presents a flowchart representation of a method in accordance with an embodiment of the present invention. In particular a method is presented for use in conjunction with one or more functions and features described in conjunction with FIGS. 1-12. In step 430, program data is sent to the host device relating to a plurality of video programming selections, wherein the host device generates the selection command based on one of the plurality of programming selections.

Figure 14:
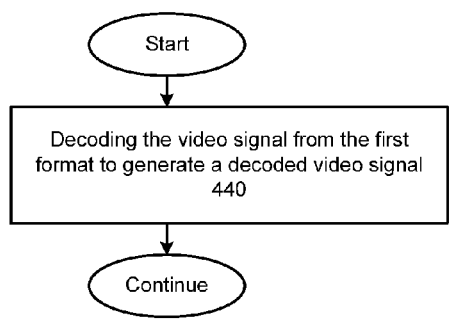
FIG. 14 presents a flowchart representation of a method in accordance with an embodiment of the present invention.

FIG. 14 presents a flowchart representation of a method in accordance with an embodiment of the present invention. In particular a method is presented for use in conjunction with one or more functions and features described in conjunction with FIGS. 1-13. In step 430, the video signal is decoded from the first format to generate a decoded video signal, wherein generating the processed video signal includes encoding the decoded video signal, and wherein the second format is at least one of, transcoded, transcaled, and transrated, from the first format.

Figure 15:
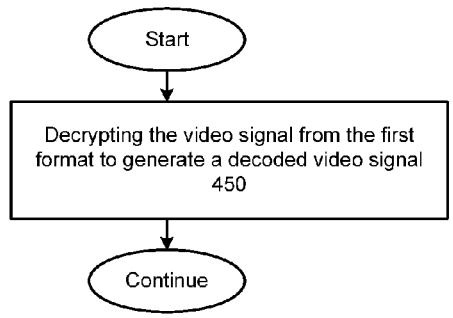
FIG. 15 presents a flowchart representation of a method in accordance with an embodiment of the present invention.

FIG. 15 presents a flowchart representation of a method in accordance with an embodiment of the present invention In particular a method is presented for use in conjunction with one or more functions and features described in conjunction with FIGS. 1-14. In step 450, the video signal is decrypted from the first format to generate a decrypted video signal, wherein generating the processed video signal includes encoding the decrypted video signal.

Figure 16:
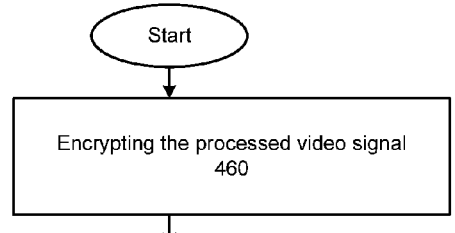
FIG. 16 presents a flowchart representation of a method in accordance with an embodiment of the present invention.

FIG. 16 presents a flowchart representation of a method in accordance with an embodiment of the present invention. In particular a method is presented for use in conjunction with one or more functions and features described in conjunction with FIGS. 1-15. In step 460, the processed video signal is encrypted.

As used herein, the term video signal includes video signals, with or without accompanying audio signals.

In preferred embodiments, the various circuit components are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a video encoding system that can be implemented as a USB dongle device or video card, video processing and video storage systems for use therewith and with other processing systems. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A universal serial bus (USB) dongle device for use in conjunction with a host device, the USB dongle device comprising:
   a USB interface for receiving selection data from the host device that indicates a selection of a first video format from a plurality of available formats, for receiving an input video signal from the host device in the first video format, for receiving a power signal from the host device, and for transferring a processed video signal to the host device; and
   an encoding module, coupled to the USB interface and powered by the power signal, that generates the processed video signal in a second video format based on the input video signal, wherein the first video format differs from the second video format;
   a decoding module, coupled to the USB interface and the encoding module, that when activated by the selection data from the host device, decodes the input video signal from the first video format to generate a decoded video signal;
   wherein the encoding module generates the processed video signal by encoding the decoded video signal, and wherein the second video format is at least one of, transcoded, transcaled, or transrated, from the first video format.

2. The USB dongle device of claim 1 further comprising:
   a decryption module, coupled to the USB interface and the encoding module, that when activated by selection data from the host device, decrypts the video signal from the first video format to generate a decrypted video signal;
   wherein the encoding module generates the processed video signal by encoding the decrypted video signal.

3. The USB dongle device of claim 1 further comprising:
   an encryption module, coupled to the encoding module, that when activated by selection data from the host device, encrypts the processed video signal.

4. The USB dongle device of claim 1 wherein the second format is a selected based on the selection data.

5. A method for use in a universal serial bus (USB) dongle device that is coupleable to a host device via a universal serial bus (USB) interface, the method comprising:
   receiving selection data from the host device via the USB interface that indicates a selection of a first video format from a plurality of available formats;
   when a decoding module is activated by the selection data from the host device, decoding an input video signal from the first video format to generate a decoded video signal;
   receiving the input video signal via the USB interface in the first video format;
   generating a processed video signal in a second video format based on the input video signal, wherein the first video format differs from the second video format, wherein, when the decoding module is activated, the processed video signal is generated by encoding the decoded video signal, and wherein the second video format is at least one of, transcoded, transcaled, or transrated, from the first video format;
   transferring the processed video signal to the host device via the USB interface; and
   receiving a power signal from the host device to power the USB dongle device.

6. The method of claim 5 wherein the second video format is selected based on the selection data.

7. The method of claim 5 wherein the first video format includes an encrypted digital format, and wherein the method further comprises:
   decrypting the input video signal from the first video format to generate a decrypted video signal;
   wherein generating the processed video signal includes encoding the decrypted video.

8. The method of claim 5 wherein generating the processed video signal includes encryption.

* * * * *